US008472625B2

(12) United States Patent
Chen et al.

(10) Patent No.: US 8,472,625 B2
(45) Date of Patent: Jun. 25, 2013

(54) METHOD AND SYSTEM FOR PROTECTING 3D VIDEO CONTENT

(75) Inventors: Xuemin Chen, Rancho Santa Fe, CA (US); Samir Hulyalkar, Newtown, PA (US); Marcus Kellerman, San Diego, CA (US); Ilya Klebanov, Thornhill (CA)

(73) Assignee: Broadcom Corporation, Irvine, CA (US)

( * ) Notice: Subject to any disclaimer, the term of this patent is extended or adjusted under 35 U.S.C. 154(b) by 898 days.

(21) Appl. No.: 12/560,592

(22) Filed: Sep. 16, 2009

(65) Prior Publication Data

US 2011/0064220 A1 Mar. 17, 2011

(51) Int. Cl.
*G06F 21/00* (2006.01)

(52) U.S. Cl.
USPC .......................................................... 380/217

(58) Field of Classification Search
USPC .......................................................... 380/217
See application file for complete search history.

(56) References Cited

U.S. PATENT DOCUMENTS

| | | | | |
|---|---|---|---|---|
| 5,805,700 A * | 9/1998 | Nardone et al. | ............... | 380/217 |
| 5,838,791 A * | 11/1998 | Torii et al. | ..................... | 380/217 |
| 7,212,636 B2 * | 5/2007 | Chaubert | ...................... | 380/218 |
| 8,027,470 B2 * | 9/2011 | Candelore et al. | ............ | 380/210 |
| 2003/0133571 A1 * | 7/2003 | Chaubert | ...................... | 380/217 |
| 2003/0152227 A1 * | 8/2003 | Javidi | ............................ | 380/219 |
| 2004/0081333 A1 * | 4/2004 | Grab et al. | .................... | 382/100 |
| 2004/0174998 A1 * | 9/2004 | Youatt et al. | .................. | 380/210 |
| 2004/0228401 A1 * | 11/2004 | Chen | ............................. | 375/240 |
| 2006/0078113 A1 * | 4/2006 | Javidi et al. | .................. | 380/210 |
| 2006/0282665 A1 * | 12/2006 | Zhu et al. | ...................... | 713/160 |
| 2008/0137847 A1 * | 6/2008 | Candelore et al. | ............ | 380/200 |
| 2009/0142041 A1 * | 6/2009 | Nagasawa et al. | ............ | 386/124 |

* cited by examiner

*Primary Examiner* — Oscar Louie
(74) *Attorney, Agent, or Firm* — Thomas| Horstemeyer, LLP

(57) ABSTRACT

A video receiver receives a compressed 3D video comprising a base view video and an enhancement view video. The base view video and the enhancement view video are encrypted using same encryption engine and buffered into corresponding coded data buffers (CDBs), respectively. The buffered base view and enhancement view videos are decrypted using same decryption engine corresponding to the encryption engine. The decrypted base view and enhancement view videos are decoded for viewing. The video receiver is also operable to encrypt video content of the received compressed 3D video according to corresponding view information and/or coding layer information. The resulting encrypted video content and unencrypted video content of the received compressed 3D video are buffered into corresponding CDBs, respectively. The buffered encrypted video content are decrypted and are decoded together with the buffered unencrypted video content of the received compressed 3D video for reviewing.

18 Claims, 6 Drawing Sheets

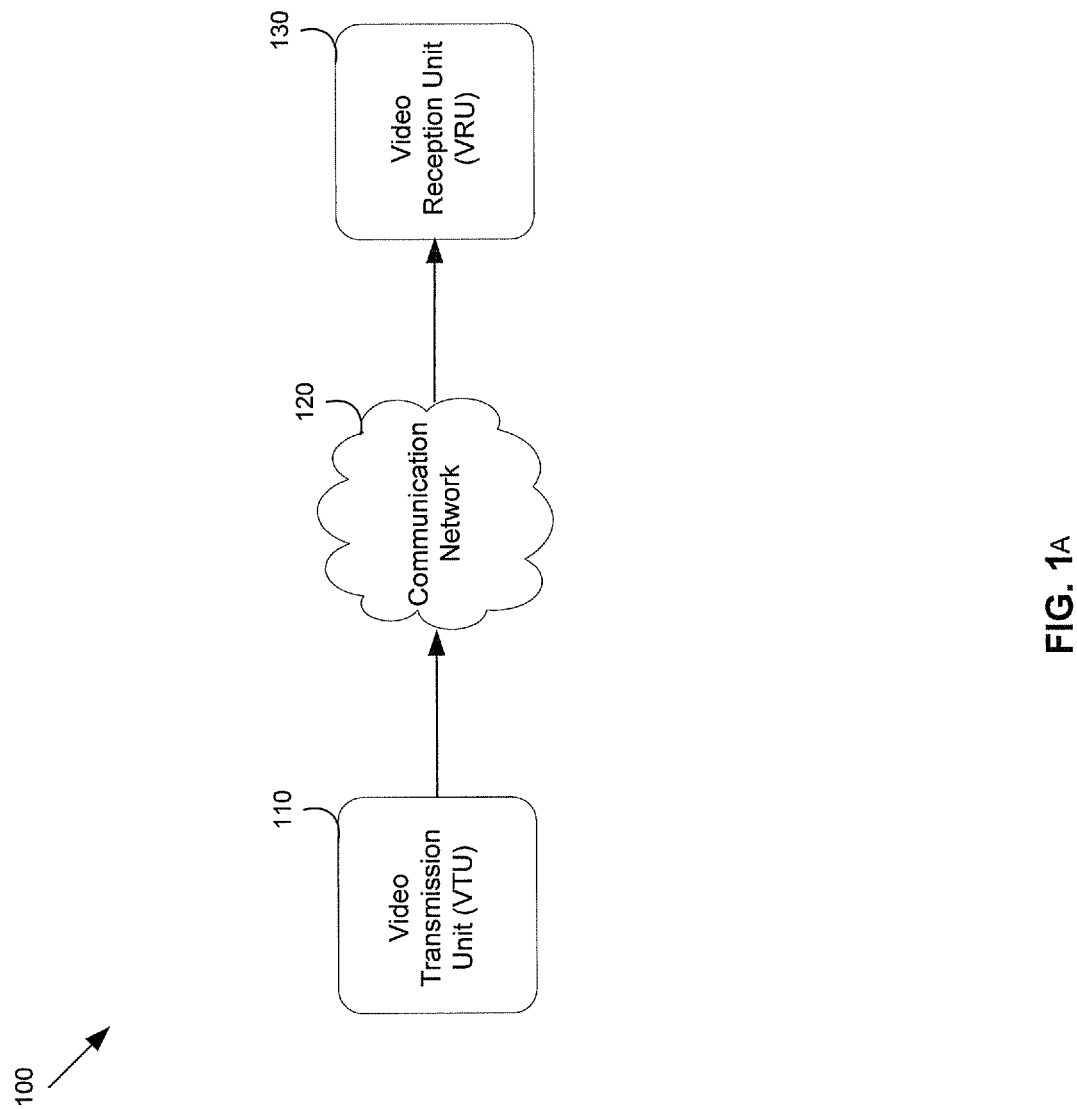

METHOD AND SYSTEM FOR PROTECTING 3D VIDEO CONTENT

CROSS-REFERENCE TO RELATED APPLICATIONS/INCORPORATION BY REFERENCE

This application makes reference to:
U.S. application Ser. No. 12/554,416 entitled "Method and System for Processing 2D/3D Video" and filed on Sep. 4, 2009;
U.S. application Ser. No. 12/546,644 entitled "Method and System for Converting a 3D Video with Targeted Advertisement into a 2D Video for Display" and filed on Aug. 24, 2009;
U.S. Provisional Application Ser. No. 61/242,644 entitled "Method and System for Rendering 3D Graphics Based on 3D Display Capabilities" and filed on Sep. 15, 2009;
U.S. application Ser. No. 12/545,679 entitled "Method and System for Asymmetrical Rate Control for 3D Video Compression" and filed on Aug. 21, 2009;
U.S. application Ser. No. 12/560,554 entitled "Method and System for Frame Buffer Compression and Memory Resource Reduction for 3D Video" and filed on Sep. 16, 2009;
U.S. application Ser. No. 12/560,578 entitled "Method and System for Watermarking 3D Content" and filed on Sep. 16, 2009; and
U.S. application Ser. No. 12/560,592 entitled "Method and System for Protecting 3D Video Content" and filed on Sep. 16, 2009.

Each of the above stated applications is hereby incorporated herein by reference in its entirety.

FIELD OF THE INVENTION

Certain embodiments of the invention relate to video processing. More specifically, certain embodiments of the invention relate to a method and system for protecting 3D video content.

BACKGROUND OF THE INVENTION

Digital video capabilities may be incorporated into a wide range of devices such as, for example, digital televisions, digital direct broadcast systems, digital recording devices, and the like. Digital video devices may provide significant improvements over conventional analog video systems in processing and transmitting video sequences with increased bandwidth efficiency.

Video content may be recorded in two-dimensional (2D) format or in three-dimensional (3D) format. In various applications such as, for example, the DVD movies and the digital TV, a 3D video is often desirable because it is often more realistic to viewers than the 2D counterpart. A 3D video comprises a left view video and a right view video. A 3D video frame may be produced by combining left view video components and right view video components, respectively.

Various video encoding standards, for example, MPEG-1, MPEG-2, MPEG-4, H.263, and H.264/AVC, have been established for encoding digital video sequences in a compressed manner. A frame in a compressed video may be coded in three possible modes: I-picture, P-picture, and B-picture. Compressed video frames may be divided into groups of pictures (i). Each GOP comprises one I-picture, several P-pictures and/or several B-pictures for transmission.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for asymmetrical rate control for 3D video compression, substantially as shown in and/or described in connection with at least one of the figures, as set forth more completely in the claims.

These and other features and advantages of the present invention may be appreciated from a review of the following detailed description of the present invention, along with the accompanying figures in which like reference numerals refer to like parts throughout.

BRIEF DESCRIPTION OF SEVERAL VIEWS OF THE DRAWINGS

FIG. 1A is a block diagram of an exemplary video coding system that is operable to use the same encryption and decryption engine to encrypt and decrypt base view and enhancement video content of a compressed 3D video, in accordance with an embodiment of the invention.

DETAILED DESCRIPTION OF THE INVENTION

Figure 1B:
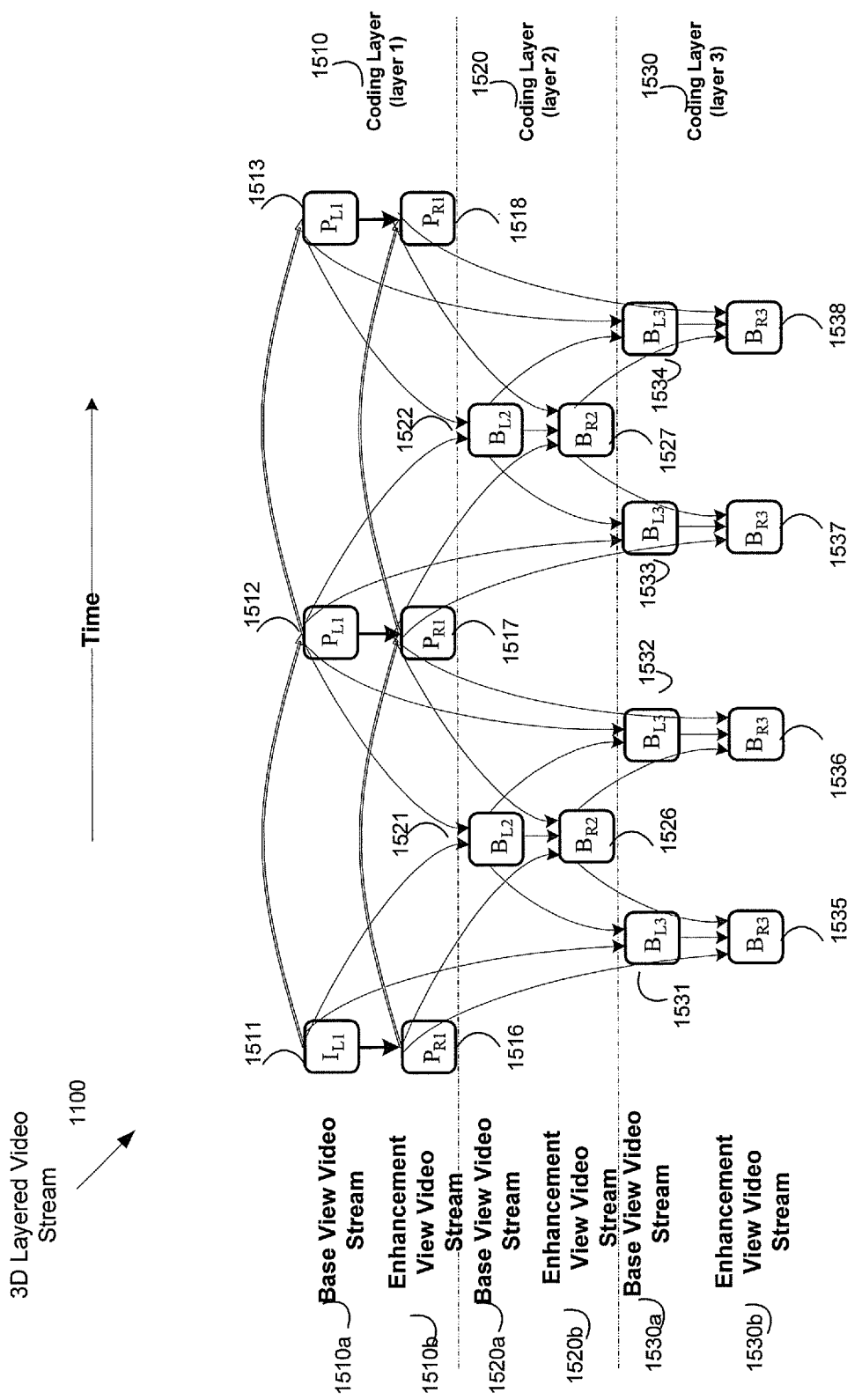
FIG. 1B is a diagram illustrating an exemplary 3D layered compressed stream that is encrypted and decrypted using the same encryption and decryption engine for associated base view and enhancement video content, in accordance with an embodiment of the invention.

Certain embodiments of the invention may be found in a method and/or system for protecting 3D video content. In various embodiments of the invention, a video receiver is operable to receive a compressed 3D video comprising a base view video and an enhancement view video. The base view video and the enhancement view video may be encrypted using the same encryption engine and buffered into corresponding coded data buffers, respectively. The buffered base view and enhancement view videos may be decrypted using the same decryption engine and decoded for viewing.

The encryption engine may be operable to encrypt video content of the received compressed 3D video according to corresponding view. For example, the encryption engine may be operable to encrypt video content in the base view video but not encrypt video content in the enhancement view video. The encrypted base view video and the enhancement view video may be buffered into the corresponding coded data buffers, respectively. The buffered encrypted base view video may be decrypted and may be decoded together with the buffered enhancement view video for viewing.

The encryption engine may be operable to encrypt video content of the received compressed 3D video according to corresponding coding layers. For example, the encryption engine may be operable to encrypt video content in low layer pictures such as pictures in coding layers≦N_Layer, where N_Layer is a coding layer index threshold and N_layer is a positive integer, of the base view video and/or the enhancement view video, but not encrypt video content in higher layer pictures such as pictures in coding layers>N_Layer. The encrypted low layer pictures may be buffered into corresponding coded data buffers, respectively. The buffered encrypted low layer pictures may be decrypted and may be decoded together with the buffered higher layer pictures in the base view video and/or the enhancement view video for viewing.

FIG. 1A is a block diagram of an exemplary video coding system that is operable to use the same encryption and decryption engine to encrypt and decrypt base view and enhancement video content of a compressed 3D video, in accordance with an embodiment of the invention. Referring to FIG. 1, there is shown a video transmission unit (VTU) 110, a communication network 120 and a video reception unit (VRU) 130.

The VTU 110 may comprise suitable logic, circuitry, interfaces and/or code that may be operable to provide compressed video content to the VRU 130. The VTU 110 may be operable to acquire an uncompressed 3D source video, which comprise a left view video and a right view video. The VTU 110 may be operable to compress the acquired 3D source video into two coding view videos, namely, a base view video and an enhancement view video using, for example, MPEG-4 Multi-view Video Coding (MVC) standard. Pictures in the base view video and the enhancement video may be generated using various approaches such as a layered coding approach. The layered coding approach may be used to generate pictures in several coding layers with inter-layer dependency. For example, base view pictures at a lower coding layer may be used to predict base view pictures in a next higher coding layer. In each coding layer, pictures in the base view video and the enhancement view video may comprise I-pictures, P-pictures and/or B-pictures. Depending on application, the VTU 110 may be operable to encrypt the base view video and the enhancement video for a conditional access (CA) to associated service at viewers. The resulting encrypted base view and enhancement view videos may be multiplexed into a single transport stream for transmission. Each video stream in the transport stream may be identified by its own program identifier (PID), for example.

Although two coding views, namely, a base view and an enhancement view are illustrated for the VTU 110 in FIG. 1 for a MVC 3D video, the invention may not be so limited. Accordingly, using the same encryption and decryption engine to encrypt and decrypt base view and enhancement video content of a compressed 3D video is applicable to a video system which uses MVC with more than 2 coding views without departing from the spirit and scope of various embodiments of the invention.

The communication network 120 may comprise suitable logic, circuitry, interfaces and/or code that may be operable to provide platforms for communication between the VTU 110 and the VRU 130. The communication network 120 may be implemented as a wired or wireless communication network. The communication network 120 may be a local area network, a wide area network, the Internet, and the like.

The VRU 130 may comprise suitable logic, circuitry, interfaces and/or code that may be operable to receive a transport stream from the VTU 110 over the communication network 120. The received transport stream may comprise multiple video streams such as a base view video stream and an enhancement view video stream of a compressed 3D video. Each video stream in the received transport stream may carry its own specific PID. The VRU 130 may be operable to extract the base view video stream and the enhancement view video stream from the received transport stream according to corresponding PIDs. The extracted base view and the enhancement view video streams may be decrypted in order to view corresponding video content. The resulting decrypted base view and enhancement view video streams may be buffered for video decoding. From a content security perspective, the VRU 130 may be operable to restrict undesired access to the buffered video content. In this regard, the VRU 130 may be operable to encrypt the decrypted base view and enhancement view video streams and then buffer the encrypted video content for video decoding. Consequently, the buffered video content may be decrypted before being decoded for viewing. The VRU 130 may be operable to use the same encryption and decryption engine for encrypt and decrypt video content of the base view video and the enhancement view video so as to reduce device cost. The encryption and decryption engine may be adaptive to video data path and may context switch between the base view video and the enhancement view video. For example, the same encryption and decryption engine may be used to encrypt and/or decrypt video contents in a different way according to a corresponding context such like in the base view video or the enhancement view video. Examples of the VRU 130 may comprise, for example, set-top boxes, personal computers, and the like.

In an exemplary operation, the VTU 110 may be operable to acquire an uncompressed 3D video. The acquired uncompressed 3D video may comprise a left view video and a right view video. The VTU 110 may be operable to use MPEG-4 MVC standard to compress the acquired uncompressed 3D video into a base view video and an enhancement view video, each of which may comprise a plurality of compressed pictures. Pictures in the base view video and the enhancement view video may be encrypted for conditional access (CA) to associated service at viewers. The VTU 110 may be operable to multiplex the encrypted base view and enhancement view videos into a single transport stream for transmission. Each video stream in the transport stream may be identified by its own unique program identifier (PID). The transport stream may be communicated with the VRU 130 via the communication network 120. The VRU 130 may be operable to extract the base view video and the enhancement view video from the received transport stream according to corresponding PIDs. With an authorized access to associated service, the VRU 130 may be operable to decrypt the extracted base view and the enhancement view video streams. The resulting decrypted base view and enhancement view video streams may be encrypted and buffered for video decoding. Accordingly, the buffered video content may be decrypted before being decoded for viewing. In this regard, the VRU 130 may be operable to utilize the same encryption/decryption engine for encrypting/decrypting video content in the base view video and the enhancement view video, respectively. The encryption/decryption engine may be adaptive to video data path. The VRU 130 may use the same encryption/decryption engine to secure buffered video content by context switching between the base view video and the enhancement view video.

FIG. 1B is a diagram illustrating an exemplary 3D layered compressed stream that is encrypted and decrypted using the same encryption and decryption engine for associated base view and enhancement video content, in accordance with an embodiment of the invention. Referring to FIG. 1B, there is shown a 3D layered stream 1500. The 3D layered stream 1500 comprises coding layers 1510-1530, which correspond to the base layer (layer 1), the middle layer (layer 2) and the high layer (layer 3), respectively, of the 3D layered stream 1500. Two coding views are generated or produced in each coding layer using MPEG-4 MVC standard, for example. A base view video stream 1510a and an enhancement view video stream 1510b are generated in the coding layer 1510. Each video stream in the coding layer 1510 may comprise a plurality of pictures, of which pictures 1511-1518, 1521-1527, and 1531-1538 are illustrated. For a given view, pictures in a higher coding layer may be coded based on adjacent pictures in lower coding layers. For example, in the enhancement view, the picture 1536 in the coding layer 1530 (layer 3) may be coded based on the picture 1516 in the coding layer 1510 (layer 1) and the picture 1526 in the coding layer 1520 (layer 2). Pictures in the base view video and the enhancement view video may be encrypted and multiplexed into a single transport stream for transmission. An intended video receiver such as the VRU 130 may be operable to extract the base view video and the enhancement view video from the received transport stream according to corresponding PIDs. The VRU 130 may be operable to decrypt the extracted base view and the enhancement view video streams for service access. In addition, the resulting decrypted base view and enhancement view video streams may be encrypted and buffered for video decoding. The buffered video content need to be decrypted before being decoded for viewing. In this regard, the VRU 130 may be operable to utilize the same encryption/decryption engine for encrypting/decrypting video content in the base view video and the enhancement view video, respectively.

Figure 2:
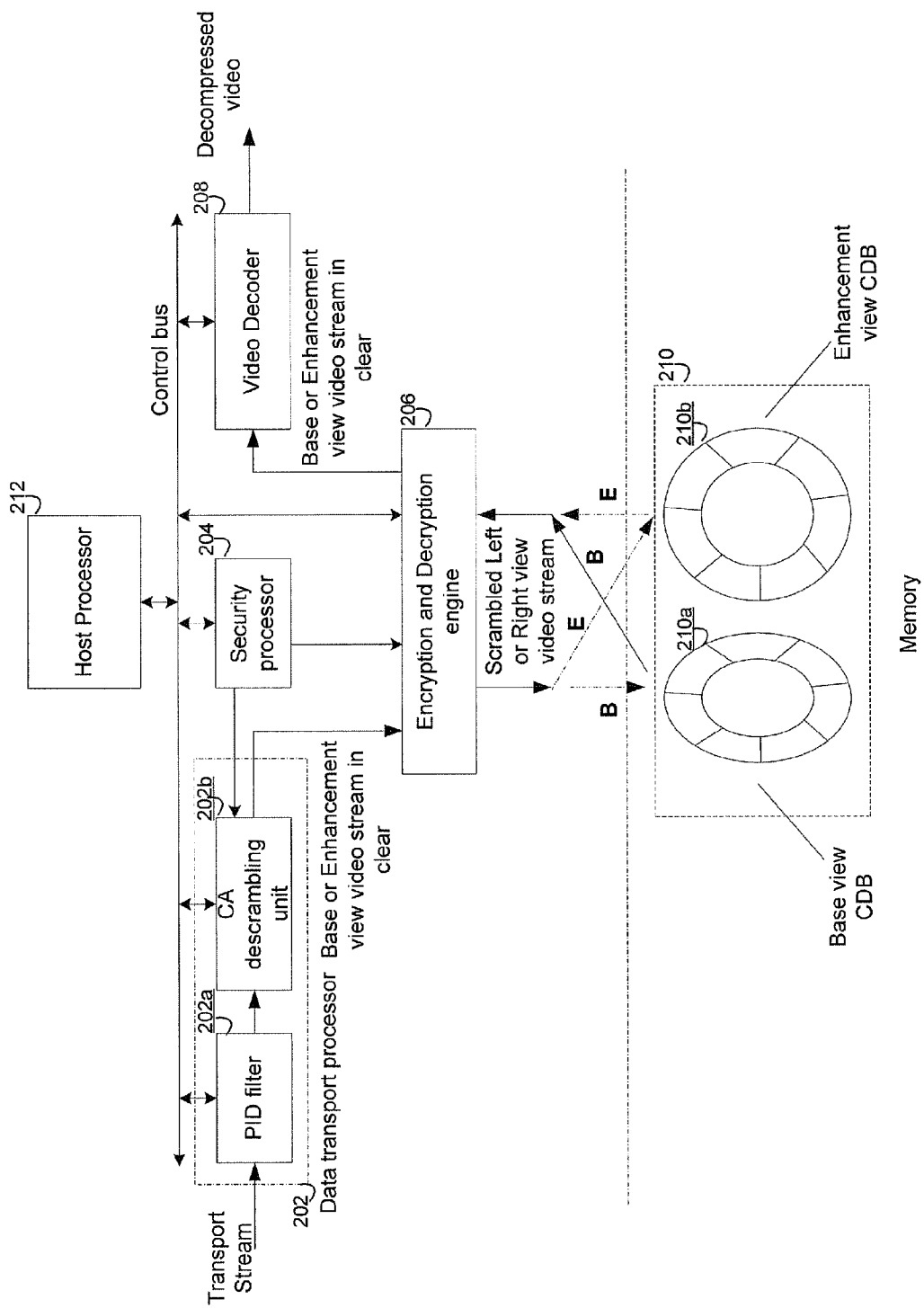
FIG. 2 is a diagram illustrating an exemplary video reception unit that is operable to encrypt and decrypt base view and enhancement video content of a compressed 3D video using the same encryption and decryption engine, in accordance with an embodiment of the invention.

FIG. 2 is a diagram illustrating an exemplary video reception unit that is operable to encrypt and decrypt base view and enhancement video content of a compressed 3D video using the same encryption and decryption engine, in accordance with an embodiment of the invention. Referring to FIG. 2, there is shown a video reception unit (VRU) 200. The VRU 200 comprises a data transport processor 202, a security processor 204, an encryption and decryption engine 206, a memory 208, a video decoder 210 and a host processor 212. The data transport processor 202 comprises a PID filter and a conditional access (CA) descrambling unit 202b. The memory 208 comprises a base view coded data buffer (CDB) 208a and an enhancement view coded data buffer (CDB) 208b.

The data transport processor 202 may comprise suitable logic, circuitry, interfaces and/or code that may be operable to receive a transport stream from the VTU 110. The received transport stream may comprise a base view video and an enhancement view video of a compressed 3D video. The data transport processor 202 may be operable to extract the base view video and the enhancement view video according to corresponding PID. The data transport processor 202 may be operable to validate its access to a service associated with the compressed 3D video.

The PID filter 202a may comprise suitable logic, circuitry, interfaces and/or code that may be operable to analyze PD information in the received transport stream. The PID filter 202a may be operable to determine whether the received transport stream may comprise one or more video streams having specific PIDs.

The CA descrambling unit 202b may comprise suitable logic, circuitry, interfaces and/or code that may be operable to descramble the base view video stream and the enhancement view video stream in the received transport stream. The CA descrambling unit 202b may be operable to perform video content descrambling using a specific secret key. The specific secret key may be provided by the security processor 204. The CA descrambling unit 202b may be operable to communicate the resulting decrypted base view and enhancement view video streams to the encryption and decryption engine 206.

The security processor 204 may comprise suitable logic, circuitry, interfaces and/or code that may be operable to generate and/or extract secret keys for video content scrambling and/or descrambling. The security processor 204 may be operable to provide, for example, an encrypted session key or Control Word (CW), to the CA descrambling unit 202b such that the base view video stream and the enhancement view video stream in the received transport stream may be descrambled for viewing. A secret key may be extracted from a received control message, for example, or may be generated or calculated by the security processor 204 depending on implementation.

The encryption and decryption engine 206 may comprise suitable logic, circuitry, interfaces and/or code that may be operable to scramble and/or descramble 3D video content in and out of coded data buffers. In this regard, the encryption and decryption engine 206 may be data path dependent. Depending on the view of the received video stream, the encryption and decryption engine 206 may be operable to context switch between the base view video and the enhancement view video. For example, the encryption and decryption engine 206 may be operable to encrypt or scramble the base view video stream in clear and store into the base view CDB 210a. Similarly, the encryption and decryption engine 206 may also be operable to encrypt or scramble the enhancement view video stream in clear and store the encrypted enhancement view video stream in the enhancement view CDB 210b. Consequently, the encryption and decryption engine 206 may be operable to decrypt or descramble the buffered encrypted video data into corresponding video data in clear. For example, the encryption and decryption engine 206 may be operable to decrypt or descramble the encrypted base view video stream from the base view CDB 210a and communicate the resulting decrypted base view video stream with the video decoder for base view video coding. Similarly, the encryption and decryption engine 206 may be operable to decrypt or descramble the encrypted enhancement view video stream from the enhancement view CDB 210b and communicate the resulting decrypted enhancement view video stream with the video decoder for enhancement view video coding.

The video decoder 208 may comprise suitable logic, circuitry, interfaces and/or code that may be operable to decode the base view and/or the enhancement view video streams in clear into a left view and a right view video for viewing. The video decoder 208 may be operable to utilize various video decompression algorithms such as MPEG-4 Multi-view Video Coding (MVC) standard and/or other video formats to form decompressed or decoded video contents in the left view video and the right view video for a resulting decompressed 3D video.

The memory 210 may comprise suitable logic, circuitry, and/or code that may be operable to store information such as executable instructions and data that may be utilized by various device components such as the host processor 212, the encryption and decryption engine 206 and the video decoder 208 of the VRU 200. The memory 210 may comprise RAM, ROM, low latency nonvolatile memory such as flash memory and/or other suitable electronic data storage.

The base view CDB 210a and the enhancement view CDB 210b may comprise suitable logic, circuitry, and/or code that may be operable to store the encrypted base view and the enhancement view video streams, respectively. The base view CDB 210a and the enhancement view CDB 210b may be utilized to compensate for delay variations that may be associated with incoming coded pictures in the base view video and the enhancement view video, respectively. The buffered video data may be decoded via the video decoder 210 for viewing. The base view CDB 210a and the enhancement view CDB 210b may comprise magneto- and/or optical drives such as a hard disk. The base view CDB 210a and the enhancement view CDB 210b may also comprise solid state memory such as flash memory and/or other suitable electronic data storage capable of recording and storing data and instructions.

The host processor 212 may comprise suitable logic, circuitry, and/or code that may be operable to manage and control operations of processing modules of the VRU 200. For example, the host processor 212 may be operable to configure and/or control operation of processing modules such as the security processor 204 and encryption and decryption engine 206, program multiple contexts for the encryption and decryption engine 206. The host processor may also be operable to generate, for example, a metadata table to store picture status such as, for example, complete pictures in the base view CDB 210a and/or the enhancement view CDB 210b ready for decoding. The host processor 212 may also be operable to record encryption states such as secret key change locations into the metadata table.

In an exemplary operation, the data transport processor 202 may be operable to receive a transport stream. The received transport stream may comprise a base view video and an enhancement view video of a compressed 3D video. The PID filter 202a may be operable to evaluate PID information in the received transport stream. The base view video and the enhancement view video may be extracted from the received transport stream according to the evaluated PID information from the PID filter 202a. The CA descrambling unit 202b may be operable to descramble the extracted base view and the enhancement view video streams, respectively, using a specific secret key. The specific secret key may be provided by the security processor 204. The security processor 204 may be operable to generate and/or extract secret keys to be used for video scrambling and/or descrambling by the CA descrambling unit 206b as well as the encryption and decryption engine 206. The encryption and decryption engine 206 may be operable to perform encryption and decryption for video content in both the base view video and the enhancement view video such that the corresponding 3D video content in the base view CDB 210a and the enhancement view CDB 210b may be secured, respectively. The buffered video content in the base view video and the enhancement view video may be decoded via the video decoder 208 for viewing.

Figure 3:
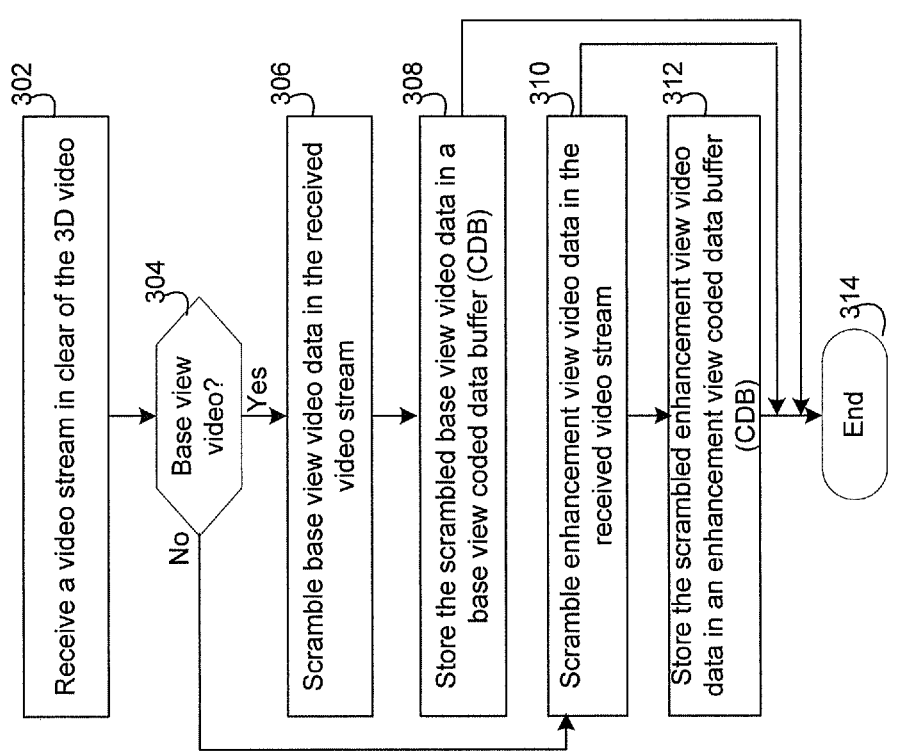
FIG. 3 is a flow chart illustrating exemplary steps that are utilized to encrypt base view and enhancement video content of a compressed 3D video using the same encryption and decryption engine, in accordance with an embodiment of the invention.

FIG. 3 is a flow chart illustrating exemplary steps that are utilized to encrypt base view and enhancement video content of a compressed 3D video using the same encryption and decryption engine, in accordance with an embodiment of the invention. Referring to FIG. 3, the exemplary steps start with step 302, where the encryption and decryption engine 206 may be operable to receive video stream of the 3D video in clear. In step 304, it may be determined whether the received video stream is a base view video or an enhancement view video. In instances where the received view video may be a base view video, then in step 306, where the encryption and decryption engine 206 may be operable to encrypt or scramble base view video data in the received video stream and record corresponding video data index. In step 308, the encrypted or scrambled base view video data may be stored in the base view CDB 210a. The exemplary steps may end at step 314.

In step 304, in instances where the received view video may be an enhancement view video, then in step 310, where the encryption and decryption engine 206 may be operable to encrypt or scramble enhancement view video data in the received video stream and record corresponding video data index. In step 308, the encrypted or scrambled enhancement view video data may be stored into the enhancement view CDB 210b. The exemplary steps may end at step 314.

Figure 4:
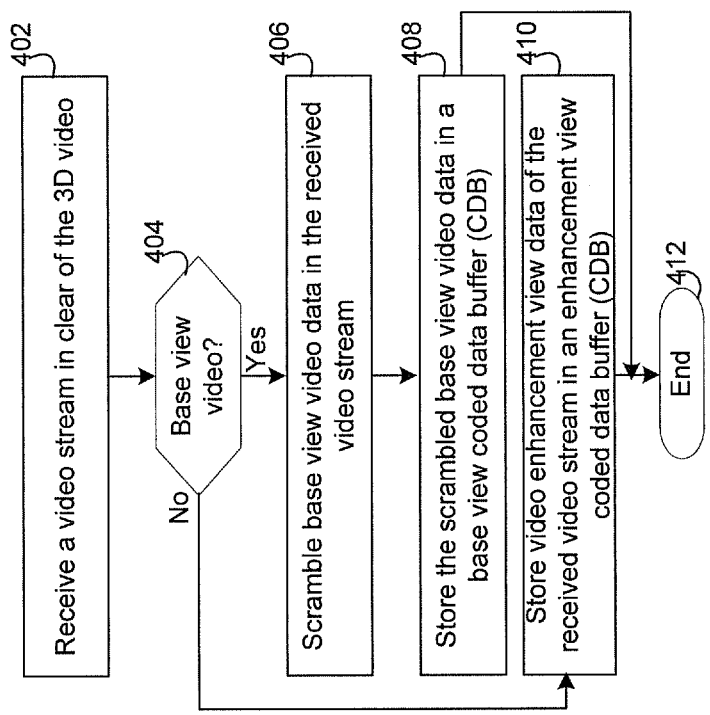
FIG. 4 is a flow chart illustrating exemplary steps that are utilized to encrypt base view and enhancement video content of a compressed 3D video based on associated coding views, in accordance with an embodiment of the invention.

FIG. 4 is a flow chart illustrating exemplary steps that are utilized to encrypt base view and enhancement video content of a compressed 3D video based on associated coding views, in accordance with an embodiment of the invention. Referring to FIG. 4, the exemplary steps start with step 402, where the encryption and decryption engine 206 may be operable to receive a video stream in clear of the 3D video. In step 404, it may be determined whether the received video stream is a base view video or an enhancement view video. In instances where the received view video may be a base view video, then in step 406, where the encryption and decryption engine 206 may be operable to encrypt or scramble base view video data in the received video stream and record corresponding video data index. In step 408, the encrypted or scrambled base view video data may be stored into the base view CDB 210a. The exemplary steps may end at step 412.

In step 404, in instances where the received view video may be an enhancement view video, then in step 410, the enhancement view video data in the received video stream may be stored into the enhancement view CDB 210b. The exemplary steps may end at step 412.

Figure 5:
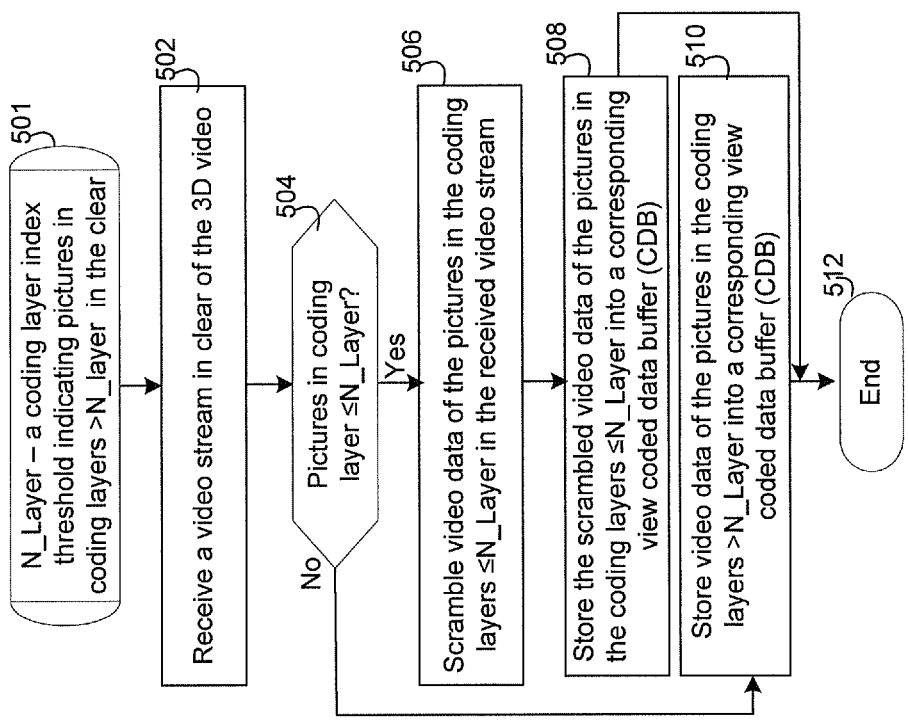
FIG. 5 is a flow chart illustrating exemplary steps that are utilized to encrypt base view and enhancement video content of a compressed 3D video based on associated coding layers, in accordance with an embodiment of the invention.

FIG. 5 is a flow chart illustrating exemplary steps that are utilized to encrypt base view and enhancement video content of a compressed 3D video based on associated coding layers, in accordance with an embodiment of the invention. Referring to FIG. 5, the exemplary steps start with step 501, where parameter N_Layer is a coding layer index threshold indicating that pictures in coding layers>N_layer may be kept in the clear. In step 502, the encryption and decryption engine 206 may be operable to receive a video stream in clear of the 3D video. In step 504, it may be determined whether pictures in the received video stream are associated coding layers that are less than or equal to N_Layer. In instances where the pictures in the received video stream are associated coding layers that are less than or equal to N_Layer, then in step 506, the encryption and decryption engine 206 may be operable to encrypt or scramble the pictures in the coding layers that are less than and/or equal to N_Layer and record corresponding video data index. In step 508, the encrypted or scrambled pictures in the coding layers that are less than and/or equal to N_Layer may be stored into a corresponding coded data buffer such as the base view CDB 210a. The exemplary steps may end at step 512.

In step 504, in instances where the pictures in the received video stream are associated coding layers greater than N_Layer, then in step 510, the received pictures associated coding layers greater than N_Layer may be kept in clear and stored into corresponding CDB. The exemplary steps may end at step 512.

Aspects of a method and system for protecting 3D video content are provided. In accordance with various embodiments of the invention, the VRU 200 may be operable to receive a transport steam from the VTU 110. The received transport stream may comprise a compressed 3D video. The compressed 3D video comprises a base view video and an enhancement view video. The base view video and the enhancement view video may be encrypted using the same encryption engine such as the encryption and decryption engine 206. The encrypted base view video and the encrypted enhancement view video may be buffered in the base view CDB 210a and the enhancement view CDB 210b, respectively. The buffered base view video and the buffered enhancement view video may be decrypted using the same decryption engine such as the encryption and decryption engine 206. The resulting decrypted base view and enhancement view video may be decoded via the video decoder 208 for viewing.

As described with respect to FIG. 4, for example, the encryption and decryption engine 206 may be operable to encrypt video content of the received compressed 3D video according to corresponding view. For example, the encryption and decryption engine 206 may be operable to encrypt video content in the base view video but not encrypt video content in the enhancement view video. The encrypted base view video and the enhancement view video may be buffered into the base view CDB 210a and the enhancement view CDB 210b, respectively. The buffered encrypted base view video may be decrypted. The resulting decrypted base view video and the buffered enhancement vide video may be decoded via the video decoder 208 for viewing.

As described with respect to FIG. 5, the encryption and decryption engine 206 may be operable to encrypt video content of the received compressed 3D video according to corresponding coding layers. For example, the encryption and decryption engine 206 may be operable to encrypt video content in low layer pictures such as pictures in coding layers $\leq$ N_Layer, where N_Layer is a coding layer index threshold and N_layer is a positive integer, of the base view video and/or the enhancement view video but not encrypt video content in higher layer pictures such as pictures in coding layers>N_Layer. The encrypted low layer pictures may be buffered into corresponding CDB such as the base view CDB 210a and the enhancement view CDB 210b. The buffered encrypted low layer pictures may be decrypted. The resulting decrypted low layer pictures and the buffered higher layer pictures in the base view video and/or the enhancement vide video may be decoded via the video decoder 208 for viewing.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for a method and system for protecting 3D video content.

Accordingly, the present invention may be realized in hardware, software, or a combination thereof. The present invention may be realized in a centralized fashion in at least one computer system, or in a distributed fashion where different elements may be spread across several interconnected computer systems. Any kind of computer system or other apparatus adapted for carrying out the methods described herein may be suited. A typical combination of hardware and software may be a general-purpose computer system with a computer program that, when being loaded and executed, may control the computer system such that it carries out the methods described herein. The present invention may be realized in hardware that comprises a portion of an integrated circuit that also performs other functions.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for video processing, the method comprising:
performing by one or more processors and circuits in a video processing system:
encrypting a base view video of a compressed three-dimensional (3D) video using an encryption engine;
encrypting an enhancement view video of said compressed 3D video using said encryption engine,
wherein pictures of one or more coding layers with corresponding coding layer index less than or equal to N layer, where N Layer is a coding layer index threshold and N layer is a positive integer, of said compressed 3D video are encrypted using said encryption engine and pictures of one or more coding layers with corresponding coding layer index greater than N layer of said compressed 3D video are not encrypted;
buffering said encrypted base view video and said encrypted enhancement view video into at least one coded data buffer memory; and
transporting the buffered said encrypted base view video and said encrypted enhancement view video of the at least one coded data buffer memory to a video decryption engine for decryption and subsequently transporting the decrypted base view and enhancement view videos to a video decoding engine for viewing.

2. The method according to claim 1, comprising:
decrypting said buffered base view video using a decryption engine corresponding to said encryption engine; and
decrypting said buffered enhancement view video using said decryption engine corresponding to said encryption engine.

3. The method according to claim 2, comprising decoding said decrypted base view video and said decrypted enhancement view video.

4. The method according to claim 1, comprising encrypting said base view using said encryption engine without encrypting said enhancement view video.

5. The method according to claim 4, comprising buffering said encrypted base view video and said enhancement view video.

6. The method according to claim 5, comprising:
decrypting said buffered base view video using a decryption engine corresponding to said encryption engine; and
decoding said decrypted base view video and said enhancement view video.

7. The method according to claim 1, comprising buffering said encrypted pictures of said one or more coding layers with corresponding coding layer index less than or equal to N_layer, and said pictures in clear of said one or more coding layers with corresponding coding layer index greater than N_layer.

8. The method according to claim 7, comprising:
decrypting said buffered pictures of said one or more coding layers with corresponding coding layer index less than or equal to N_layer using a decryption engine corresponding to said encryption engine; and
decoding said decrypted pictures of said one or more coding layers with corresponding coding layer index less than or equal to N_layer, and said pictures in clear of said one or more coding layers with corresponding coding layer index greater than N_layer.

9. The method according to claim 1, wherein N_layer is greater than 2.

10. A system for video processing, the system comprising:
one or more processors and circuits for use a video processing system, wherein said one or more processors and circuits are operable to:
encrypt a base view video of a compressed three-dimensional (3D) video using an encryption engine; and
encrypt an enhancement view video of said compressed 3D video using said encryption engine,
wherein pictures of one or more coding layers with corresponding coding layer index less than or equal to N layer, where N Layer is a coding layer index threshold and N layer is a positive integer, of said compressed 3D video are encrypted using said encryption engine and pictures of one or more coding layers with corresponding coding layer index greater than N layer of said compressed 3D video are not encrypted;
buffer said encrypted base view video and said encrypted enhancement view video into at least one coded data buffer memory; and
transport the buffered said encrypted base view video and said encrypted enhancement view video of the at least one coded data buffer memory to a video decryption engine for decryption and subsequently transport the decrypted base view and enhancement view videos to a video decoding engine for viewing.

11. The system according to claim 10, wherein said one or more processors and circuits are operable to decrypt said buffered base view video using a decryption engine corresponding to said encryption engine; and decrypt said buffered enhancement view video using said decryption engine corresponding to said encryption engine.

12. The system according to claim 11, wherein said one or more processors and circuits are operable to decode said decrypted base view video and said decrypted enhancement view video.

13. The system according to claim 10, wherein said one or more processors and circuits are operable to encrypt said base view using said encryption engine without said enhancement view video being encrypted.

14. The system according to claim 13, wherein said one or more processors and circuits are operable to buffer said encrypted base view video and said enhancement view video.

15. The system according to claim 14, wherein said one or more processors and circuits are operable to decrypt said buffered base view video using a decryption engine corresponding to said encryption engine; and decode said decrypted base view video and said enhancement view video.

16. The system according to claim 10, wherein said one or more processors and circuits are operable to buffer said encrypted pictures of said one or more coding layers with corresponding coding layer index less than or equal to N_layer, and said pictures in clear of said one or more coding layers with corresponding coding layer index greater than N_layer.

17. The system according to claim 16, wherein said one or more processors or circuits are operable to decrypt said buffered pictures of said one or more coding layers with corresponding coding layer index less than or equal to N_layer using a decryption engine corresponding to said encryption engine; and decode said decrypted pictures of said one or more coding layers with corresponding coding layer index less than or equal to N_layer, and said pictures in clear of said one or more coding layers with corresponding coding layer index greater than N_layer.

18. The system according to claim 10, wherein N_layer is greater than 2.

* * * * *

UNITED STATES PATENT AND TRADEMARK OFFICE
CERTIFICATE OF CORRECTION

PATENT NO. : 8,472,625 B2  
APPLICATION NO. : 12/560592  
DATED : June 25, 2013  
INVENTOR(S) : Xuemin Chen et al.

Page 1 of 1

It is certified that error appears in the above-identified patent and that said Letters Patent is hereby corrected as shown below:

In the Claims

Claim 17, Column 12, line 31, after the word "processors", delete the word "or" and insert the word --and--.

Signed and Sealed this  
Twenty-second Day of October, 2013

Teresa Stanek Rea  
*Deputy Director of the United States Patent and Trademark Office*